(12) United States Patent
Su et al.

(10) Patent No.: US 9,403,727 B2
(45) Date of Patent: Aug. 2, 2016

(54) METHOD FOR PRODUCING FERRITE CERAMIC

(71) Applicants: Shaohua Su, Shenzhen (CN); Jinhui Yu, Shenzhen (CN)

(72) Inventors: Shaohua Su, Shenzhen (CN); Jinhui Yu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 14/486,082

(22) Filed: Sep. 15, 2014

(65) Prior Publication Data

US 2015/0108697 A1 Apr. 23, 2015

(30) Foreign Application Priority Data

Oct. 22, 2013 (CN) .......................... 2013 1 0497364

(51) Int. Cl.
| | |
|---|---|
| C04B 35/64 | (2006.01) |
| C04B 35/26 | (2006.01) |
| C04B 35/626 | (2006.01) |
| H01F 41/02 | (2006.01) |
| C04B 35/632 | (2006.01) |
| C04B 35/634 | (2006.01) |
| C04B 35/638 | (2006.01) |
| H01F 1/34 | (2006.01) |

(52) U.S. Cl.
CPC ................. *C04B 35/64* (2013.01); *C04B 35/26* (2013.01); *C04B 35/6261* (2013.01); *C04B 35/6264* (2013.01); *C04B 35/62655* (2013.01); *C04B 35/632* (2013.01); *C04B 35/638* (2013.01); *C04B 35/6342* (2013.01); *H01F 41/0246* (2013.01); *C04B 2235/5436* (2013.01); *C04B 2235/5445* (2013.01); *C04B 2235/6025* (2013.01); *C04B 2235/6567* (2013.01); *H01F 1/34* (2013.01)

(58) Field of Classification Search
CPC ........ C04B 35/26–35/2691; C04B 2235/6025; C04B 35/6342
See application file for complete search history.

(56) References Cited

U.S. PATENT DOCUMENTS

| | | | | |
|---|---|---|---|---|
| 5,628,938 A * | 5/1997 | Sangeeta | ............... | C04B 35/573 264/28 |
| 7,794,557 B2 * | 9/2010 | Hui | ........................ | B82Y 30/00 156/89.11 |
| 7,910,214 B2 * | 3/2011 | Kimura | .................. | C04B 35/265 252/62.6 |
| 8,034,417 B2 * | 10/2011 | Fukaya | ............... | C04B 35/4682 427/508 |
| 8,546,699 B2 * | 10/2013 | Kamei | .................... | C03C 3/066 174/256 |
| 8,890,647 B2 * | 11/2014 | Moon | ................... | C04B 35/265 336/233 |

(Continued)

OTHER PUBLICATIONS

Eastman. Butvar Polyvinyl Butyral Resin Properties and Uses. N.p.: Eastman, 2013.*

*Primary Examiner* — Russell Kemmerle, III
(74) *Attorney, Agent, or Firm* — Ipro, PLLC; Na Xu

(57) ABSTRACT

A method for producing ferrite ceramic includes the steps of providing a ferrite powder; oven-drying the ferrite powder; adding organic additives into the oven-dried powder and mixing them to form a ferrite slurry; debubbling the ferrite slurry and then tape casting it into a green tape; heating the green tape in air to 300-500° C. for 5 h to remove the organic additives from the green tape; sintering the organic additives removed green tape at 900-1000° C. for 2-5 h to obtain ferrite ceramic.

6 Claims, 3 Drawing Sheets

(56) References Cited

U.S. PATENT DOCUMENTS

| | | | |
|---|---|---|---|
| 2006/0049540 A1* | 3/2006 | Hui | B82Y 30/00 264/140 |
| 2009/0081527 A1* | 3/2009 | He | H01M 4/8657 429/482 |
| 2011/0018671 A1* | 1/2011 | Kamei | C03C 3/066 336/200 |
| 2012/0326828 A1* | 12/2012 | Nakamura | H01F 1/344 336/200 |
| 2013/0057375 A1* | 3/2013 | Ankyu | B32B 18/00 336/83 |
| 2013/0057376 A1* | 3/2013 | Yamamoto | B32B 18/00 336/110 |
| 2014/0375174 A1* | 12/2014 | Yan | C04B 35/64 310/364 |

* cited by examiner

METHOD FOR PRODUCING FERRITE CERAMIC

FIELD OF THE INVENTION

The present invention relates to a method for producing ferrite ceramic, more particularly to a new method for producing ferrite ceramic with excellent magnetic properties.

DESCRIPTION OF RELATED ART

Recently, ferrite ceramic is commercially available for use as components in making electrical and electronic circuits including transformers, inductors, switching elements, microwave circuits, and other high-frequency apparatus, due to its desired magnetic and electrical properties at microwave frequencies.

The ferrite ceramic is formed by means of dry-pressing process in the prior art. Specifically, a method for producing the ferrite ceramic related to the present disclosure includes the steps of: mixing ferrite powder together with organic additives uniformly, such as binder, according to a certain proportion to obtain a kind of mixture; sieving and prilling the mixture; casting the sieved and prilled mixture into a green tape with a desired shape under a certain pressure by means of dry-pressing forming, and then firing the green tape to obtain a ferrite ceramic. However, using such a method, some problems would occur during the producing process, for example, cracks and distortions of the product occurred during the dry-pressing progress, non-configurable structure of the product, lower production efficiency, and difficulties on controlling the size of the product.

Therefore, it is desirable to provide a new method for producing the ferrite ceramic, which can overcome the above-mentioned problems.

Figure 1:
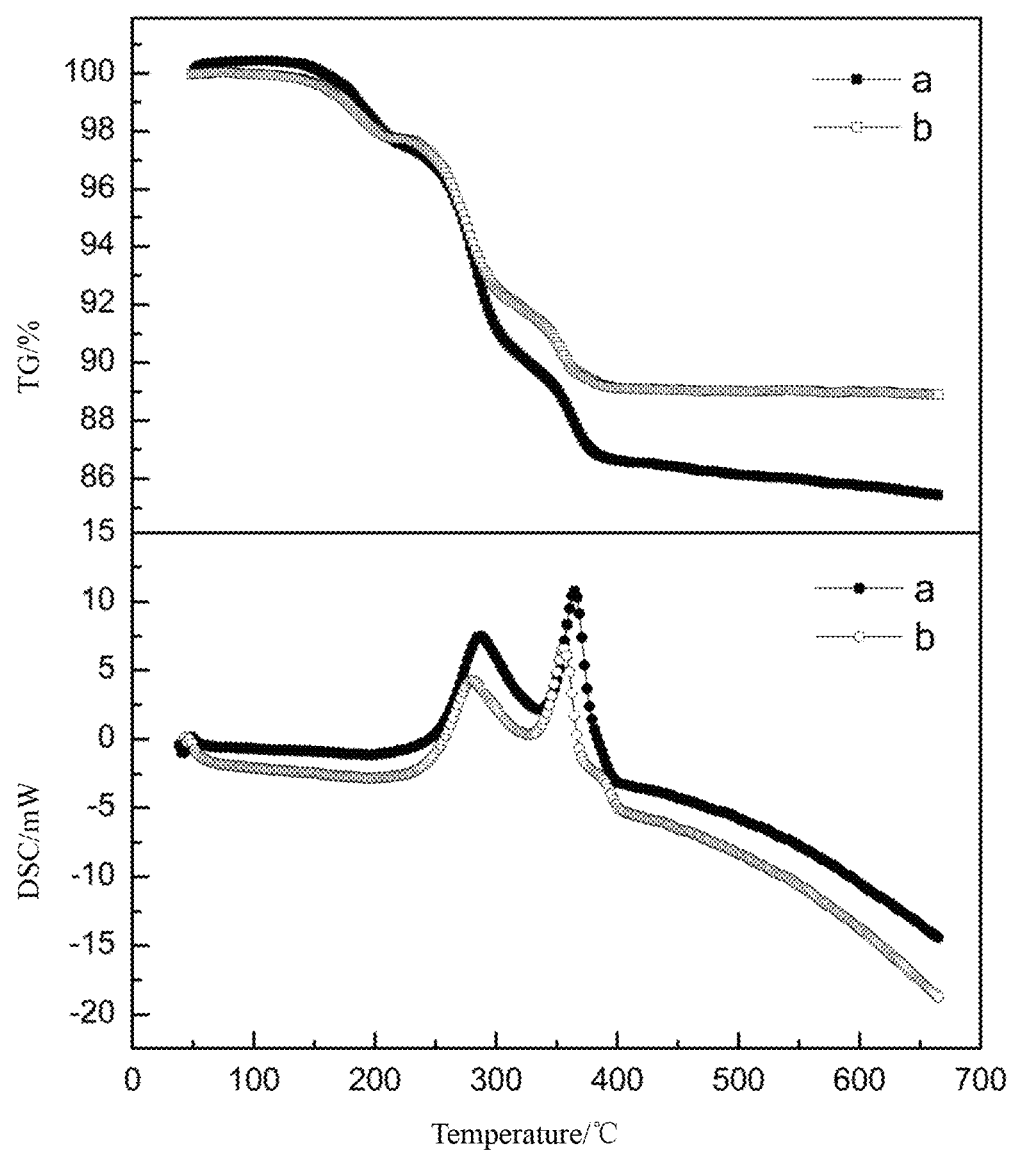
FIG. 1 is TG-DSC curves for a green tape formed in different Examples, Curve a for the green tape formed in Example 1, and Curve b for the green tape formed in Example 2.

Many aspects of the embodiments can be better understood with reference to the drawings mentioned above. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF ILLUSTRATIVE EMBODIMENTS

Reference will now be made to describe several embodiments of the present disclosure in detail.

According to the present disclosure, a method for producing ferrite ceramic comprises the steps of:

Material preparation: ferrite material purchased from the market used as raw material is prepared, and then is milled into ferrite powder in a ball-mill filled with zirconia balls, wherein a median particle size of the ferrite powder is in the range of from 0.5 μm to 3.5 μm, preferably 2 μm, so as to improve the reactivity of the ferrite powder.

Oven-drying: the ferrite powder is oven-dried until a water content of the ferrite powder reduces to below 0.1 wt. %.

Pulping: organic additives including but not limitation with binder, plasticizer, dispersing agent, or solvent are added into the oven-dried ferrite powder, and the ferrite powder and organic additives are mixed and wet milled in the ball-mill to form ferrite slurry.

In pulping step, the additives and ferrite powder are mixed and wet milled in the ball mill twice. Specifically, at the first time, the solvent, dispersing agent and ferrite powder are mixed and wet milled for 20 h to obtain a uniform mixture. At the second time, the binder and plasticizer are added into the mixture and wet milled for 20 h to obtain the ferrite slurry. The kinds and amounts of the solvent, dispersing agent, ferrite powder, binder and plasticizer added during the pulping process are shown in Table 1 below, respectively. In fact, the kinds and amounts of plasticizer and binder have effect on the rheological properties of the ferrite slurry and the mechanic properties of a green tape formed by the next process. The kinds and amounts of the dispersing agent have effect on the stability and dispersity of the ferrite slurry.

TABLE 1

| Name | Function | Percentage (%) |
| --- | --- | --- |
| Ferrite Powder |  | 100 |
| Toluene | Solvent | 30-55 |
| Alcohol | Solvent | 10-25 |
| KD-1 | Dispersing agent | 0.1-2 |
| First Polyvinyl butyral (PVB 1) | Binder | 5-15 |
| Second Polyvinyl butyral (PVB 1) | Binder | 0-5 |
| Dibutyl phthalate (DBP) | Plasticizer | 2-5 |

Wherein, a molecular weight of the first polyvinyl butyral is in the range of from 50000 to 70000, and the molecular weight of the second polyvinyl butyral is in the range of from 100000 to 120000. In fact, if the molecular weight of the binder increases, the bonding strength of the binder would increase, and the solubility of the binder would reduce.

Forming: the ferrite slurry is debubbled by means of heating and vacuum pumping, and then the ferrite slurry is tape casted into a green tape by a tape casting machine. It is usually convenient at this stage to further cut or shape the green tape into desired form according to the predetermined end product, taking into account a shrinkage which occurs on sintering.

Organic additives removal: the green tape is heated to 300-500° C. for 5 h in air to remove the organic additives from the green tape. This heating can be carried out in an oxygen-containing atmosphere. The organic additives can be converted into the corresponding oxides during the heating process, and then the corresponding oxides volatilize while the temperature rises to the boiling temperature of the corresponding oxides. Thus, there should be sufficient oxygen in air so that the organic additives can be removed out completely from the green tape.

Sintering: sintering the green tape from which the organic additives were removed at 900-1000° C. for 2-5 h to obtain dense ferrite ceramic.

The detailed examples of the method for producing the ferrite ceramic in accordance with the present invention are described below.

Example 1

Ferrite material is prepared and then pulverized into the ferrite powder in the ball-mill. The median particle size of the ferrite powder is 0.5 μm. The ferrite powder is oven-dried until the water content of the ferrite powder reduces to below 0.1 wt. %. Then, the ferrite powder in amount of 100 wt. %, the toluene in amount of 36 wt. %, the alcohol in amount of 22 wt. %, and the KD-1 in amount of 1 wt. % are mixed and wet milled for 20 h in the ball mill to obtain an uniform mixture. The first polyvinyl butyral (the molecular weight of the first polyvinyl butyral is 70000) in amount of 12 wt. %, as the binder, and the dibutyl phthalate in amount of 3 wt. %, as the plasticizer, are added into the mixture and wet milled for 20 h in the ball mill to obtain the ferrite slurry. The ferrite slurry is debubbled by means of heating and vacuum pumping, and then tape casted into the green tape by the tape casting machine. The green tape is heated to 300° C. for 5 h in air to remove the organic additives from the green tape. The organic additives removed green tape is sintered at 900° C. for 2 h to obtain the dense ferrite ceramic.

As shown in Curve a of FIG. 1, when the heating temperature is in a range of 150° C. to 400° C., the weight of the green tape reduces constantly, due to the volatilization and decomposition of the organic additives. When the heating temperature is at 400° C., the organic additives decomposed completely. The plasticizer volatilizes and decomposes at 150-200° C. The binder volatilizes and decomposes at 250-300° C. The dispersing agent volatilizes and decomposes at 350-400° C. Thus, it can be sure that when the green tape is heated to over 400° C., the organic additives are removed completely from the green tape.

Figure 2:
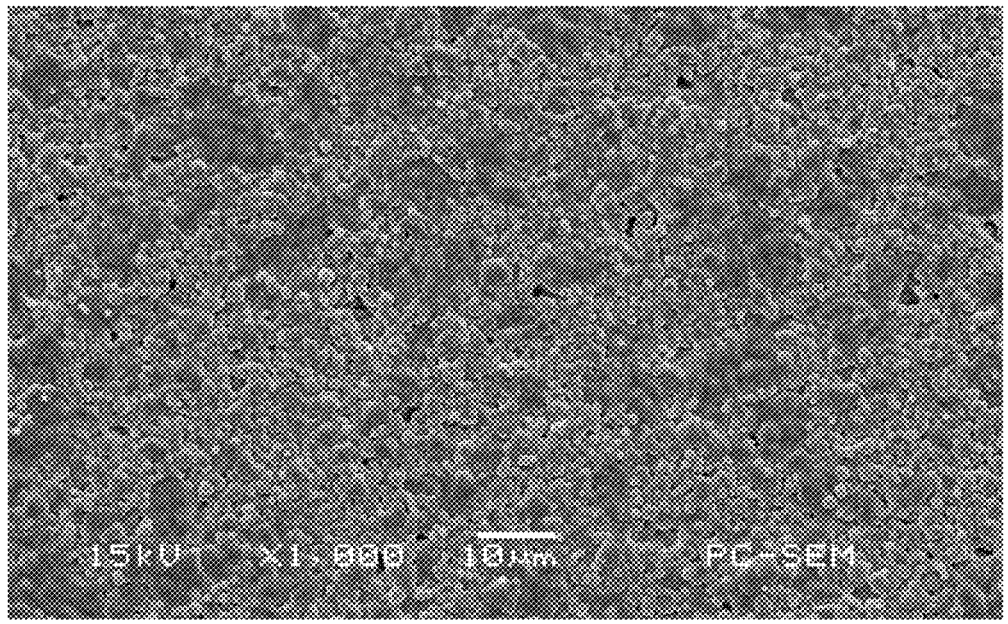
FIG. 2 is SEM image for a sintered ferrite ceramic produced in Example 1.

As shown in FIG. 2, the microstructure of thus obtained ferrite ceramic is observed by SEM (Scan Electron Microscopy). It can be seen that the ferrite ceramic has compact structure and complete morphology, and the ceramic particles are dispersed substantially uniformly in the ferrite ceramic with no agglomeration.

Figure 4:
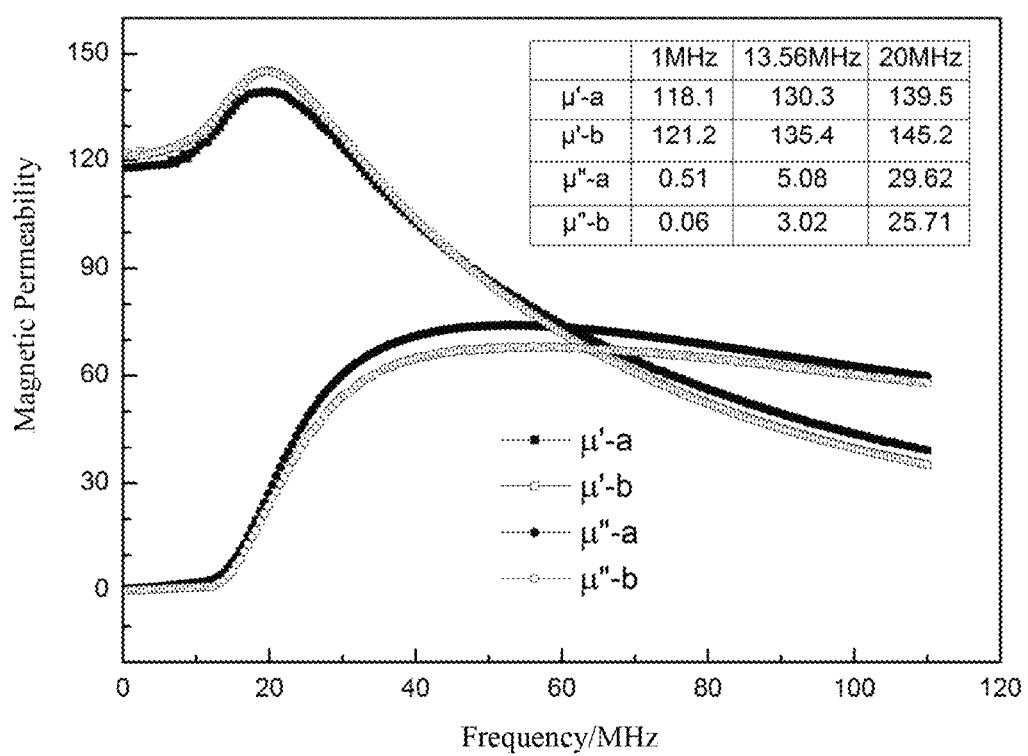
FIG. 4 is magnetic permeability spectrums for the sintered ferrite ceramic produced in different Examples, Spectrum a for the sintered ferrite ceramic produced in Example 1, and Spectrum b for the sintered ferrite ceramic produced in Example 2.

As shown in Spectrum a of FIG. 4, the value of real component of the magnetic permeability $\mu'$ of thus obtained ferrite ceramic is higher than that of the conventional ferrite ceramic, the value of imaginary component of the magnetic permeability $\mu''$ of thus obtained ferrite ceramic is lower than that of the conventional ferrite ceramic, based on the same frequency, which indicates that the ferrite ceramic produced in the present invention has more excellent magnetic property.

Example 2

Ferrite material is provided and then pulverized into the ferrite powder in the ball-mill. The median particle size of the ferrite powder is 3.5 μm. The ferrite powder is oven-dried until the water content of the ferrite powder reduces to below 0.1 wt. %. Then, the ferrite powder in amount of 100 wt. %, toluene in amount of 36 wt. %, alcohol in amount of 22 wt. %, and KD-1 in amount of 1 wt. % are mixed and wet milled for 20 h in the ball mill to obtain an uniform mixture. The first polyvinyl butyral (the molecular weight of the first polyvinyl butyral is 50000) in amount of 7 wt. % and the second polyvinyl butyral (the molecular weight of the second polyvinyl butyral is 100000) in amount of 1.5 wt. %, and the dibutyl phthalate in amount of 3 wt. % are added into the mixture and wet milled for 20 h in the ball mill to obtain the ferrite slurry. The ferrite slurry is debubbled by means of heating and vacuum pumping, and then tape casted into the green tape by the tape casting machine. The green tape is heated to 500° C. for 5 h in air to remove the organic additives from the green tape. The organic additives removed green tape is sintered at 1000° C. for 5 h to obtain the dense ferrite ceramic.

As shown in Curve b of FIG. 1, when the heating temperature is in a range of 150° C. to 400° C., the weight of the green tape reduces constantly, due to the volatilization and decomposition of the organic additives. When the heating temperature is at 400° C., the organic additives decomposed completely. The plasticizer volatilizes and decomposes at 150-200° C. The binder volatilizes and decomposes at 250-300° C. The dispersing agent volatilizes and decomposes at 350-400° C. Thus, it can be sure that when the green tape is heated to over 400° C., the organic additives are removed completely from the green tape.

Figure 3:
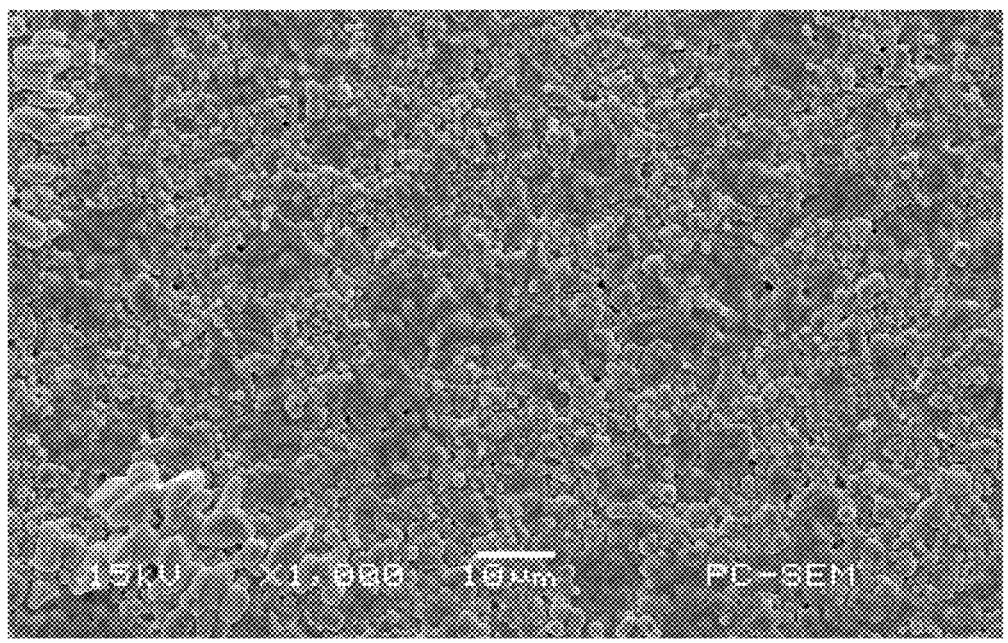
FIG. 3 is SEM image for a sintered ferrite ceramic produced in Example 2.

As shown in FIG. 3, the microstructure of thus obtained ferrite ceramic is observed by SEM. It can be seen that the ferrite ceramic has compact structure and complete morphology, and the ceramic particles are dispersed substantially uniformly in the ferrite ceramic with no agglomeration.

As shown in Spectrum b of FIG. 4, the value of $\mu'$ of thus obtained ferrite ceramic is higher than that of the conventional ferrite ceramic, the value of $\mu''$ of thus obtained ferrite ceramic is lower than that of the conventional ferrite ceramic, based on the same frequency, which indicates that the ferrite ceramic produced in the present invention has more excellent magnetic property. Compared Spectrum a and Spectrum b, it can be seen that the value of $\mu'$ of the ferrite ceramic produced in Example 2 is higher than that of the ferrite ceramic produced in Example 1, the value of $\mu''$ of the ferrite ceramic produced in Example 2 is lower than that of the ferrite ceramic produced in Example 1, which indicates that the ferrite ceramic produced in Example 2 has more excellent magnetic property.

Comparing with the prior art, the method for producing the ferrite ceramic in present invention has the following advantages: higher production efficiency, easy to controller the size of the product, enablement of configurable and complicate structure of the product, and no cracks and distortion of the product.

While the present invention has been described with reference to the specific embodiments, the description of the invention is illustrative and is not to be construed as limiting the invention. Various of modifications to the present invention can be made to the exemplary embodiments by those skilled in the art without departing from the true spirit and scope of the invention as defined by the appended claims.

What is claimed is:

1. A method for producing ferrite ceramic, comprising the steps of:
    material preparation: providing a ferrite powder;
    oven-drying: oven-drying the ferrite powder;
    pulping: adding dispersing agent and solvent into the ferrite powder, mixing and wet milling them in a ball mill for 20 h for obtaining a mixture; adding binder and plasticizer into the mixture, and wet milling them in the ball mill for 20 h for obtaining the ferrite slurry; wherein, the ferrite slurry comprises: 100 wt. % of the ferrite powder; 30 wt. % to 55 wt. % of toluene and 10 wt. % to 20 wt. % of alcohol as the solvent 0.1 wt. % to 2 wt. % of a dispersing agent 7 wt. % to 15 wt. % of a first polyvinyl butyral and 1.5 wt. % to 5 wt. % of a second polyvinyl butyral as the binder;
    and 2 wt. % to 5 wt. % of dibutyl phthalate as the plasticizer;

forming: debubbling the ferrite slurry and then tape casting it into a green tape;

organic additives removal: heating the green tape in air to 300-500° C. for 5 h for removing the organic additives from the green tape;

sintering: sintering the green tape from which the organic additives have been removed at 900-1000° C. for 2-5 h for obtaining ferrite ceramic.

2. The method for producing ferrite ceramic of claim 1, wherein the material preparation step further comprises the steps of:

providing ferrite as raw material;

pulverizing the ferrite into the ferrite powder in a ball-mill.

3. The method for producing ferrite ceramic of claim 2, wherein in the step of material preparation, the ferrite powder has a median particle size of from 0.5 μm to 3.5 μm.

4. The method for producing ferrite ceramic of claim 1, wherein in the step of oven-drying, oven-drying the ferrite powder until a water content of the ferrite powder reduces to below 0.1 wt. %.

5. The method for producing ferrite ceramic of claim 1, wherein in the step of forming, debubbling the ferrite slurry by heating and vacuum pumping.

6. The method for producing ferrite ceramic of claim 1, wherein, a molecular weight of the first polyvinyl butyral is in the range of 50000 to 70000, and a molecular weight of the second polyvinyl butyral is in the range of 100000 to 120000.

* * * * *